United States Patent [19]

Persson

[11] Patent Number: 4,527,817
[45] Date of Patent: Jul. 9, 1985

[54] QUICK COUPLING DEVICE

[75] Inventor: John Persson, Grödinge, Sweden

[73] Assignee: Nolek System AB, Norsborg, Sweden

[21] Appl. No.: 406,234

[22] PCT Filed: Dec. 22, 1981

[86] PCT No.: PCT/SE81/00390
§ 371 Date: Aug. 3, 1982
§ 102(e) Date: Aug. 3, 1982

[87] PCT Pub. No.: WO82/02240
PCT Pub. Date: Jul. 8, 1982

[30] Foreign Application Priority Data

Dec. 22, 1980 [SE] Sweden .............................. 8009077

[51] Int. Cl.³ .............................................. F16L 17/02
[52] U.S. Cl. ...................................... 285/96; 285/101
[58] Field of Search ................. 285/96, 95, 101, 100, 285/103, 106, 325, 326, 327

[56] References Cited

U.S. PATENT DOCUMENTS 3,023,030 2/1962 Torres .
4,348,039 9/1982 Miller .......................... 285/DIG. 1
4,375,297 3/1983 Persson ........................... 285/101

FOREIGN PATENT DOCUMENTS 258804 4/1913 Fed. Rep. of Germany ...... 285/101
684043 6/1930 France .............................. 285/325
791136 2/1958 United Kingdom ............... 285/325
1332782 10/1973 United Kingdom .

Primary Examiner—Dave W. Arola

[57] ABSTRACT

A quick coupling device for a fluid-tight, especially temporary connection to a pipe nipple (1) or the like, comprising a cylindrical casing (5,14), which is mechanically connectable to the pipe nipple, and a coupling piston (16,18), which is displaceably disposed in the cylindrical casing and which is permanently connectable to a pressurized fluid conduit (4) and has a through-going opening (27) for the passage of pressurized fluid to said pipe nipple, the coupling piston being displaceable, by the action of a separate actuating fluid (via 30), into sealing (21) contact with the end surface (22) of the pipe nipple (1). A separate actuating piston (29) is displaceable by the actuating fluid and adapted to actuate (32) the coupling piston (16,18) into said sealing contact, and the coupling piston has a piston surface (25) facing away from the end surface (22) of the pipe nipple and constituting a delimiting surface in an annular chamber (24) in the cylindrical casing (5), which annular chamber (24) communicates (23) with said through-going opening (27), said piston surface (25), by the action of the pressurized fluid, causing a force, directed against the pipe nipple (1), on the coupling piston (16, 18), whereby the sealing contact between the coupling piston and said end surface (22) is improved.

6 Claims, 1 Drawing Figure

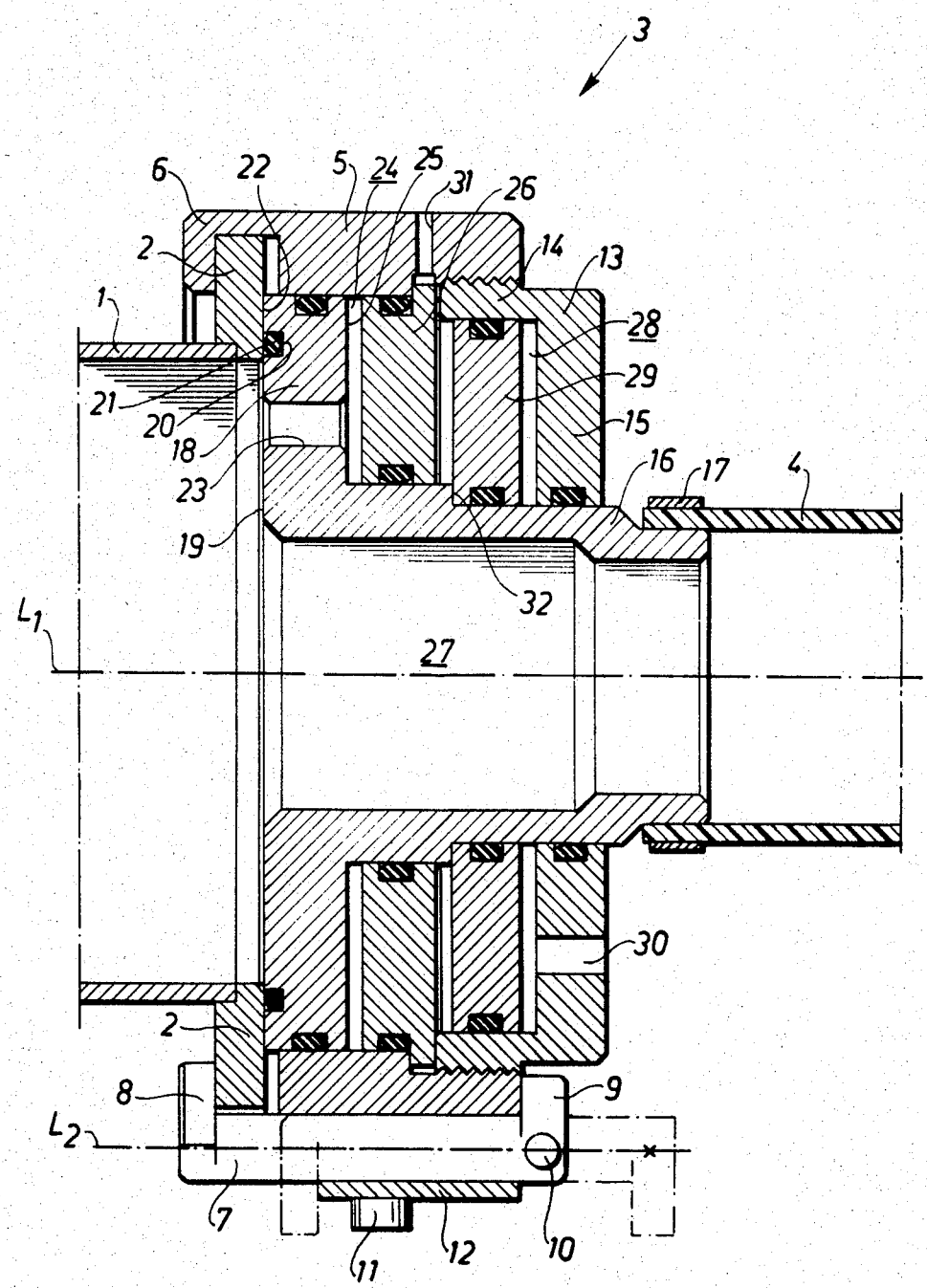

QUICK COUPLING DEVICE

The invention relates to a quick coupling device for fluid-tight, especially temporary connection to a pipe nipple or the like.

Such a device is previously known and is used for temporary connection of a pressurized fluid conduit, such as a hose, to a pipe nipple or the like, e.g. belonging to an armature, a pressure vessel or the like. The device is especially useful for such coupling in connection with tightness testing or leak detection, wherein a pressurized fluid, e.g. water or air, is to be fed to the armature in question, the pressure vessel or the like during a prescribed, usually rather short time period, so that a large number of objects can be tested per time unit.

However, a drawback involved in the known devices is that an effective sealing between the pipe nipple and the coupling device requires that the actuating force on a piston exceeds the compressive force exerted by the pressurized fluid used in the tightness test. In order to secure the required sealing effect, it may then be necessary to provide the piston with a relatively large piston surface, so that a sufficiently great force is obtained. However, this implies rather large radial dimensions of the device.

Thus, the object of the present invention is to achieve a quick coupling device which, in spite of compact radial dimensions, will secure an effective sealing, even when exposed to comparatively high pressures of the pressurized fluid, whereas the actuating pressure can be maintained at a moderate or low level.

This object is achieved by a device provided with two mutually displacable pistons, one of which is actuated by an actuating fluid (e.g. pressurized air), whereas the other piston, i.e. the coupling piston, is brought into sealing contact by the action of the actuating piston. The force exerted by the pressurized fluid (e.g. water at high pressure) on the coupling piston is totally or partly eliminated in that the pressurized fluid acts on a piston surface turned away from the sealing.

By means of the inventive device the radial dimensions can be kept at a moderate level, and the pressure of the actuating fluid can be relatively low, whereas the pressure of the testing pressurized fluid can be rather high, while maintaining the sealing effect. Further features and advantages will appear from the description below and the claims 2-6.

The invention is explained in detail below with reference to the accompanying drawing, which illustrates a central section of a quick coupling device connected to a pipe nipple having an external flange.

Thus, to the left on the drawing, there is shown a pipe nipple 1 with an annular flange 2, e.g. belonging to a pressure vessel, which is to be tightness tested by feeding pressurized water at relatively high pressure, e.g. about 15 bar. The tightness test is assumed to be performed in connection with serial production of such pressure vessels. The coupling device 3 itself is permanently connected to a feed hose 4 which communicates with a non-illustrated source of pressurized water.

The device 3 comprises a radially external cylindric casing 5, which is mechanically connectable to the flange 2 of the pipe nipple by means of an edge flange 6 extending radially inwardly and complementary to said flange 2. The edge flange 6 extends about half a turn or somewhat less circumferentially, so that the device can be pushed on transversally to the axis $L_1$ (from the top on the drawing). In a mounted position, the device can be secured by means of a locking pin 7 which is rotatable about its axis $L_2$, and at each end thereof it is provided with a hook 8 and 9, respectively, for engagement with the pipe nipple flange 2 and the casing 5, respectively. In the shown position, the locking pin 7 is in a locking position, but after rotating the same half a turn about its axis $L_2$ and displacing it to the dashed position, the whole device 3 can be released from the pipe nipple 1 by a transverse displacement (upwards on the drawing). Obviously, the mechanical connection and disconnection can be performed very quickly and simply. A pin 10 serves to indicate the turning position of the locking pin 7 and also as a handle for the turning as well as for the pulling out and pushing in operations, respectively. A guide 12 fixed by means of a screw delimits the mobility of the pin 7 along the axis $L_2$.

The casing 5 is axially adjoined to a second casing portion 13, which is internally screwed into the casing 5 and consists of, on the one hand, a cylindrical portion 14 having an external thread and, on the other hand, an end portion 15 having a central end opening for a tubular coupling piston 16, onto the axially external end of which the pressurized fluid conduit 4 is mounted and fixed by a clamp 17.

The coupling piston 16 is sealingly inserted through the end opening and extends inwardly through practically the whole device 3 and adjoins axially internally to an annular flange portion 18, which is guided and sealed at the inside of the casing 5. The annular flange portion 18 of the coupling piston comprises an annular groove 20 in its end surface 19 turned towards the pipe nipple 1, a sealing ring 21 being inserted into this annular groove. When the coupling piston is moved to the left of the drawing, the sealing ring will seal against the axially external end surface 22 of the flange 2.

The annular flange portion 18 has at least one axial through-going opening 23, which leads to an annular chamber 24 being situated radially between the outside of the tubular portion 16 of the coupling piston and the inside of the casing 5, which annular chamber is axially delimited partly by a piston surface 25 on the portion 18, partly by an annular partition wall 26. The piston surface 25 is turned away from the pipe nipple 1 and ensures that, when the pressurized fluid is fed through the hose 4, the central opening 27 of the coupling piston 16 and the opening 23 to the annular chamber 24, the coupling piston 16, 18 will be exposed to an axial compressive force component, which partly or preferably totally overcomes the inevitable separating compressive force component, whereby the sealing effect between the sealing ring 23 and the flange 2 is improved.

The partition wall 26 is fixed between the casing 5 and the cylindrical portion 14 of the casing portion 13 by means of a radially external flange and, thus, separates the annular chamber 24 communicating with the opening 23 of the coupling piston, from an axially external annular chamber 28, which is externally delimited by the casing portion 13. In this annular chamber 28 an annular actuating piston 29 is axially displaceable by means of an actuating fluid, e.g. pressurized air at a pressure of about 6 bar, which is supplied via an inlet port 30 into the end portion 15. The internally adjoining chamber of the actuating piston 29 is vented through an outlet 31 (at the top of the drawing).

Now, assume that the device 3 has been coupled mechanically to the pipe nipple 1 and that the actuating piston 29 is situated in an end position contacting the end portion 15. Firstly, actuating air is supplied through the opening 30, so that the piston is displaced to the left into the position shown on the drawing, wherein it engages with an external shoulder surface 32 on the tubular portion 16 of the coupling piston causing the coupling piston 16,18, under the action of the actuating pressure, to sealingly contact the surface 22 of the flange 2 with the sealing ring 21. Then, when pressurized water is supplied at a rather high pressure, e.g. 15 to 20 bar, via the hose 4, the pressurized water will flow through the opening 23 into the annular chamber 24 and thereby further improve the axial contact between the coupling piston 16,18 and the pipe nipple 1. Thus, no counter-pressure will be exerted by the pressurized water on the actuating piston 29.

The mechanical connection between the device 3 and the pipe nipple 1 can be modified within the scope of the inventive idea. For example, screw threads or a bayonet joint can be used. However, in case of pipe nipples having an external flange, the illustrated embodiment has proven to be especially advantageous.

I claim:

1. A device for coupling, especially temporarily, a conduit for fluid under pressure, to a pipe nipple or the like having an end surface, said device comprising: a substantially cylindrical casing, means for mechanically connection said casing to the pipe nipple, a coupling piston displaceably disposed in said casing and having a through-opening for fluid-connecting the conduit with the pipe nipple, said casing and said coupling piston in part confining therebetween a first chamber and a second chamber, means for sealing said first and second chambers respectively with respect to said casing and said coupling piston, an actuating piston in said first chamber and displaceable by an actuating fluid and engageable with said coupling piston for moving said coupling piston into engagement with the end surface of the nipple, means in said end face for sealing said coupling piston with respect to the end surface of the nipple, said coupling piston having an end face for engagement against the end surface of the nipple and a piston surface facing away from the end face and in part confining said second chamber, and means for providing fluid-communication between said second chamber and said through-opening, the piston surface subject to the fluid under pressure being larger than the end face of the coupling piston subject to the fluid under pressure when said coupling piston engages the end surface of the nipple; whereby when said casing is connected to the pipe nipple by said mechanical connecting means and said coupling piston is brought into sealing contact with the end surface of the nipple by actuating fluid applied to said actuating piston, the pressurized fluid from the conduit increases the force by which the coupling piston engages the pipe nipple end surface.

2. A coupling device according to claim 1, wherein said coupling piston comprises a substantially tubular portion defining said through opening, and also comprises an adjoining annular flange portion having a first surface forming said end face for contact with the pipe nipple end surface, and a second end surface opposite said first surface and constituting said piston surface.

3. A coupling device according to claim 2, wherein said means for providing fluid-communication comprises at least one through-going channel in said annular flange portion.

4. A coupling device according to claim 1, comprising an annular element fixed to said cylindrical casing and forming a partition wall between said first and second chambers.

5. A coupling device according to any one of claims 2 to 4, wherein said actuating piston is annular, means for sealing said actuating piston with respect to the tubular portion of the coupling piston, said tubular portion having a shoulder surface against which said actuating piston engages for moving said coupling piston.

6. A coupling device according to any one of claims 1 to 4, wherein said mechanical connecting means is a holding means for detachably connecting the casing to the end surface of the pipe nipple.

* * * * *